US009283502B2

(12) United States Patent
Balepin et al.

(10) Patent No.: US 9,283,502 B2
(45) Date of Patent: Mar. 15, 2016

(54) INERTIAL EXTRACTION SYSTEM

(75) Inventors: Vladimir Balepin, Manorville, NY (US); Anthony Castrogiovanni, Manorville, NY (US); Florin Girlea, Sea Cliff, NY (US); Andrew Robertson, West Sayville, NY (US); Pasquale Sforza, Highland Beach, FL (US)

(73) Assignee: Orbital ATK, Inc., Plymouth, MN (US)

( * ) Notice: Subject to any disclaimer, the term of this patent is extended or adjusted under 35 U.S.C. 154(b) by 169 days.

(21) Appl. No.: 13/599,709

(22) Filed: Aug. 30, 2012

(65) Prior Publication Data
US 2013/0228076 A1 Sep. 5, 2013

Related U.S. Application Data

(60) Provisional application No. 61/529,591, filed on Aug. 31, 2011.

(51) Int. Cl.
| | |
|---|---|
| *B01D 45/16* | (2006.01) |
| *B01D 53/00* | (2006.01) |
| *B01D 53/24* | (2006.01) |
| *B04C 3/00* | (2006.01) |
| *B04C 7/00* | (2006.01) |
| *B01D 49/00* | (2006.01) |
| *B04C 9/00* | (2006.01) |

(52) U.S. Cl.
CPC .............. *B01D 45/16* (2013.01); *B01D 53/002* (2013.01); *B01D 53/24* (2013.01); *B04C 3/00* (2013.01); *B04C 7/00* (2013.01); *B01D 49/006* (2013.01); *B01D 2257/504* (2013.01); *B01D 2258/0283* (2013.01); *B01D 2259/65* (2013.01); *B04C 2003/006* (2013.01); *B04C 2009/008* (2013.01)

(58) Field of Classification Search
CPC .......... B01D 46/0069; B01D 46/0076; B01D 49/006; B01D 51/08; B01D 2259/816; B01D 45/16; B01D 2259/16; B01D 53/24; B01D 2258/0283; B01D 53/002; B01D 2257/504; B04C 3/00; B04C 2009/008; B04C 7/00; B04C 2003/006
USPC ....................................... 96/389, 175; 55/292
See application file for complete search history.

(56) References Cited

U.S. PATENT DOCUMENTS

| 3,236,057 A | 2/1966 | Hashemi-Tafreshi |
| 3,376,709 A | 4/1968 | Dickey et al. |

(Continued)

FOREIGN PATENT DOCUMENTS

| CN | 101264470 A | * | 9/2008 |
| EP | 0 420 503 A2 | | 4/1991 |

(Continued)

OTHER PUBLICATIONS

International Search Report and Written Opinion mailed Nov. 5, 2012.

(Continued)

*Primary Examiner* — Duane Smith
*Assistant Examiner* — Stephen Hobson
(74) *Attorney, Agent, or Firm* — TraskBritt

(57) ABSTRACT

Disclosed herein are supersonic separation systems that can be used for the removal of $CO_2$ from a mixed gas stream. Also disclosed are methods for the separation and subsequent collection of solidified $CO_2$ from a gas stream.

22 Claims, 10 Drawing Sheets

(56) References Cited

U.S. PATENT DOCUMENTS

| | | | |
|---|---|---|---|
| 4,139,352 A | 2/1979 | McEwan et al. | |
| 4,591,367 A | 5/1986 | Pek et al. | |
| 4,731,228 A | 3/1988 | Dewitz et al. | |
| 4,736,627 A | 4/1988 | Wicks, III et al. | |
| 4,747,947 A | 5/1988 | Bannon | |
| 4,810,264 A | 3/1989 | Dewitz | |
| 4,876,004 A | 10/1989 | Verhoeff | |
| 5,062,955 A | 11/1991 | Sciamanna | |
| 5,458,777 A | 10/1995 | Khatib | |
| 5,529,591 A | 6/1996 | Dewitz | |
| 5,938,803 A | 8/1999 | Dries | |
| 6,280,502 B1 | 8/2001 | Van Veen et al. | |
| 6,372,019 B1 | 4/2002 | Alferov et al. | |
| 6,376,732 B1 | 4/2002 | Ngan et al. | |
| 6,447,574 B1 * | 9/2002 | Frier et al. | 95/29 |
| 6,513,345 B1 | 2/2003 | Betting et al. | |
| 6,524,368 B2 | 2/2003 | Betting et al. | |
| 6,537,458 B1 | 3/2003 | Polderman | |
| 6,776,825 B2 | 8/2004 | Betting et al. | |
| 6,830,734 B1 | 12/2004 | Dirkse et al. | |
| 6,830,735 B1 | 12/2004 | Bouma et al. | |
| 6,962,199 B1 | 11/2005 | Tjeenk Willink | |
| 6,979,358 B2 | 12/2005 | Ekker et al. | |
| 7,004,988 B2 | 2/2006 | Letzel | |
| 7,160,518 B2 | 1/2007 | Chen et al. | |
| 7,261,766 B2 | 8/2007 | Betting et al. | |
| 7,318,849 B2 | 1/2008 | Betting et al. | |
| 7,357,825 B2 | 4/2008 | Betting et al. | |
| 7,494,535 B2 | 2/2009 | Betting et al. | |
| 7,510,597 B2 | 3/2009 | Tee et al. | |
| 7,540,902 B2 | 6/2009 | Esparza et al. | |
| 7,594,942 B2 | 9/2009 | Polderman | |
| 7,648,544 B2 | 1/2010 | Dewitz et al. | |
| 7,771,522 B2 | 8/2010 | Esparza et al. | |
| 7,909,912 B2 | 3/2011 | Tjeenk Willink et al. | |
| 2002/0189443 A1 | 12/2002 | McGuire | |
| 2003/0145724 A1 * | 8/2003 | Betting et al. | 95/29 |
| 2006/0144080 A1 | 7/2006 | Heath et al. | |
| 2008/0196582 A1 * | 8/2008 | Tjeenk Willink et al. | 95/57 |
| 2008/0289502 A1 * | 11/2008 | Betting et al. | 95/248 |
| 2009/0031756 A1 * | 2/2009 | Betting et al. | 62/620 |
| 2009/0173073 A1 * | 7/2009 | Guidati et al. | 60/670 |
| 2009/0205488 A1 * | 8/2009 | Betting et al. | 95/30 |
| 2010/0147021 A1 * | 6/2010 | Betting et al. | 62/533 |
| 2010/0319533 A1 | 12/2010 | Betting et al. | |
| 2011/0016917 A1 | 1/2011 | Prast et al. | |

FOREIGN PATENT DOCUMENTS

| | | |
|---|---|---|
| EP | 0 496 128 A1 | 7/1992 |
| EP | 1 974 790 A1 | 10/2008 |
| GB | 711304 | 6/1954 |
| GB | 1146262 | 3/1969 |
| GB | 2 035 151 A | 6/1980 |
| GB | 2 037 610 | 7/1980 |
| GB | 2 177 951 | 2/1987 |
| JP | 1315306 A | 12/1989 |
| JP | 2-17921 | 1/1990 |
| RU | 1798009 A1 | 2/1993 |
| RU | 2 108 134 C1 | 4/1998 |
| SU | 1386309 A1 | 4/1988 |
| WO | WO 99/01194 | 1/1999 |
| WO | WO 00/10912 | 3/2000 |
| WO | WO 00/23757 | 4/2000 |
| WO | WO 02/14242 | 2/2002 |
| WO | WO 03/029739 | 4/2003 |
| WO | WO 03/055575 | 7/2003 |
| WO | WO 03/062725 | 7/2003 |
| WO | WO 2007/031476 | 3/2007 |
| WO | WO 2009/084945 | 7/2009 |
| WO | WO 2010/013999 | 2/2010 |
| WO | WO 2010/074565 | 7/2010 |
| WO | WO 2010/090510 | 8/2010 |
| WO | WO 2010/117259 | 10/2010 |
| WO | WO 2011/002277 | 1/2011 |
| WO | WO 2011/005077 | 1/2011 |
| WO | WO 2011/005077 A1 | 1/2011 |
| WO | WO 2013/033425 A1 | 3/2013 |

OTHER PUBLICATIONS

Balepin, et al. entitled "Air Separation with the Vortex Tube: New Experimental Results," 8th International Space Planes and Hypersonic Systems and Technologies Conference, Norfolk, Virginia, Apr. 27-30, 1998, 6 pages.

Sforza, et al. entitled "Coal-Derived Syngas Purification and Hydrogen Separation in a Supersonic Swirl Tube," published in *Applied Thermal Engineering* 49 (2012); pp. 154-160.

Karimi et al. entitled "Selective Dehydration of High-Pressure Natural Gas Using Supersonic Nozzles," published in *Chemical Engineering and Processing* 48 (2009), pp. 560-568.

Balepin et al, Conference Proceeding entitled "A High Efficiency Inertial $CO_2$ Extraction System—ICES," presented at 2010 NETL $CO_2$ Capture Technology Meeting, Sep. 13-17, 2010, Pittsburgh, PA, 2 pages.

Balepin et al, entitled "A High Efficiency Inertial $CO_2$ Extraction System—ICES," three (3) Posters from the Feb. 28, 2011 DOE Showcase, 3 pages.

Schinkelshoek et al. Paper entitled "Supersonic Gas Conditioning for NGL Recovery," presented at the 2006 Offshore Technology Conference held in Houston, Texas, May 1-4, 2006, 4 pages.

Sforza, et al. Paper entitled "Coal-Derived Syngas Purification and Hydrogen Separation in a Supersonic Swirl Tube," presented at the ASME Conference in Sorrento, Italy, May 2010, 6 pages.

Sforza, et al. Paper entitled "Self-Contained and Self-Powered Condensation System for Reclamation of Water from Lunar Regolith Processing," presented at the AIAA Conference Jan. 2010, 11 pages.

Prast, et al. Paper entitled "CFD for Supersonic Gas Processing," presented at the *Fifth International Conference on CFD in the Process Industries CSIRO*, Melbourne, Australia, Dec. 13-15, 2006, 6 pages.

Castrogiovanni, et al. Presentation entitled "A High Efficiency Inertial $CO_2$ Extraction System (ICES)," presented at the NETL $CO_2$ Capture Technology Meeting, Pittsburgh, PA., Jul. 11, 2012, 27 pages.

International Preliminary Report on Patentability for International Application No. PCT/US2012/053180 dated Mar. 4, 2014, 8 pages.

\* cited by examiner

Section A-A from FIG. 1

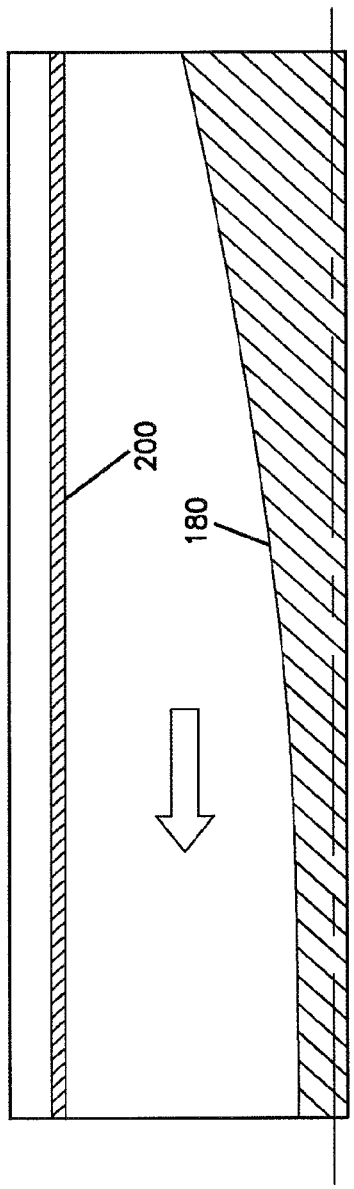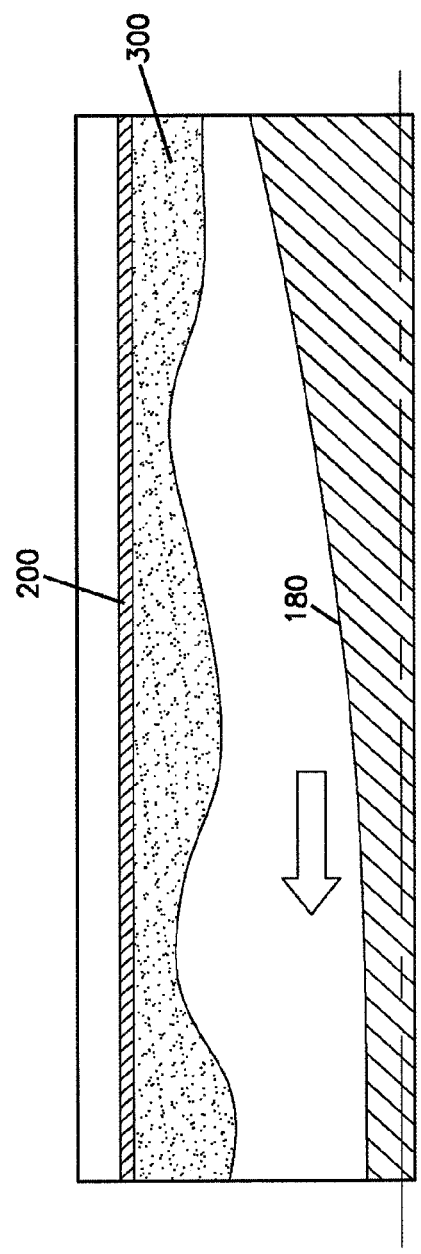
FIG. 10A
FIG. 10B

INERTIAL EXTRACTION SYSTEM

REFERENCE TO RELATED APPLICATION

This application claims the benefit of U.S. Provisional Application Ser. No. 61/529,591, filed on Aug. 31, 2011, the disclosure of which is incorporated herein by reference in its entirety.

STATEMENT REGARDING FEDERALLY SPONSORED RESEARCH

This invention was made with Government support under Contract Number DE-AR0000078 awarded by the Department of Energy. The Government has certain rights in this invention.

BACKGROUND

The present invention relates to separation systems and methods, and in particular, to gas separation systems and methods.

Various supersonic gas separation devices have been disclosed. Representative patents include U.S. Pat. Nos. 6,280,502, 6,513,345, 6,524,368, 6,776,825, 7,318,849, and 7,357,825, and representative publications include US 2010/0147021, US 2010/0319533, US 2011/0016917, WO 2010/074565, and WO 2011/002277.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The invention is directed to gas separation through condensation or desublimation of one or more species by supersonic acceleration of a gas mixture. One particular application is the removal and capture of $CO_2$ from flue gas from coal or natural gas power plants. A problem the present system solves is the separation of $CO_2$ at a reduced energy cost and improved operational efficiency, as compared to traditional methods of separation (e.g., amine scrubbing). In addition to applications where $CO_2$ is a minor component of the gas stream, such as in flue gas, the systems and methods provided herein also are applicable to gas streams where $CO_2$ is a majority component (e.g., up to 85 wt. % of the gas stream).

One proposed system is mechanically simple, does not contain any or relatively few moving parts, and is readily scalable. Low capital costs are projected for system construction, and operating costs are estimated to be significantly less than membrane and absorption based alternatives. The energy and operational costs for $CO_2$ capture and pressurization with the proposed technology is expected to be lower, as compared to amine-based $CO_2$ separation systems.

The present system is applicable to a number of processes where extraction of condensable gases is desired, such as humidity removal, or removal of various condensable hydrocarbon species from natural gas or other mixed gas streams. The separation apparatus described herein is particularly described for $CO_2$ separation from flue gas, but not limited thereto. The invention discloses a method for $CO_2$ capture utilizing an aero-thermodynamic inertial separation device. Flue gas from coal-fired power plants (after at least partial humidity removal and optional pre-compression) is directed to a converging-diverging nozzle and expanded to supersonic velocities. This process results in a rapid reduction of temperature and pressure and the condensation of undesirable constituents of flue gas, including the desublimation of $CO_2$. The higher density of the resulting particles permits inertial separation by centrifugal forces created by swirl induced in the nozzle.

For example, an embodiment of the invention is directed to a supersonic $CO_2$ separation system. This system includes a supersonic device having a shroud, a centerbody, and a converging/diverging annular duct between the shroud and the centerbody. A low pressure gas stream containing $CO_2$ enters the supersonic device, is accelerated to a supersonic velocity, and is swirled in the converging/diverging duct. Downstream, a capture slot receives solidified $CO_2$, while the supersonic gas stream, now $CO_2$-depleted, exits the supersonic portion of the system, and is subsequently diffused to a subsonic velocity.

Additionally, the system can have an ejector apparatus for reducing the pressure of the subsonic gas stream for a brief period of time to initiate supersonic flow of a low pressure gas stream containing $CO_2$.

The system also can contain a cyclone particle separator connected to the capture slot. Solid $CO_2$ is separated in the cyclone and can be stored in a vessel, while the remaining gas stream can be recirculated to the supersonic device, and introduced into a diverging portion of the converging/diverging duct.

An embodiment of the invention also is directed to a method for removing $CO_2$ from a low pressure gas stream. This method includes introducing the low pressure gas stream into a supersonic device and accelerating the gas stream to supersonic speeds, swirling the low pressure gas stream while at supersonic speeds, and separating the low pressure gas stream under supersonic speeds into a main gas stream and a product stream. The product stream contains $CO_2$, and solid $CO_2$ can be removed from the product stream. A portion of the product stream often is recirculated back into the supersonic device.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 10A is a schematic representation of a section of the experimental $CO_2$ separation device with a flow of an air stream.

FIG. 10B is a schematic representation of a section of the experimental $CO_2$ separation device with a flow of a $CO_2$-containing gas stream.

DETAILED DESCRIPTION

Figure 1:
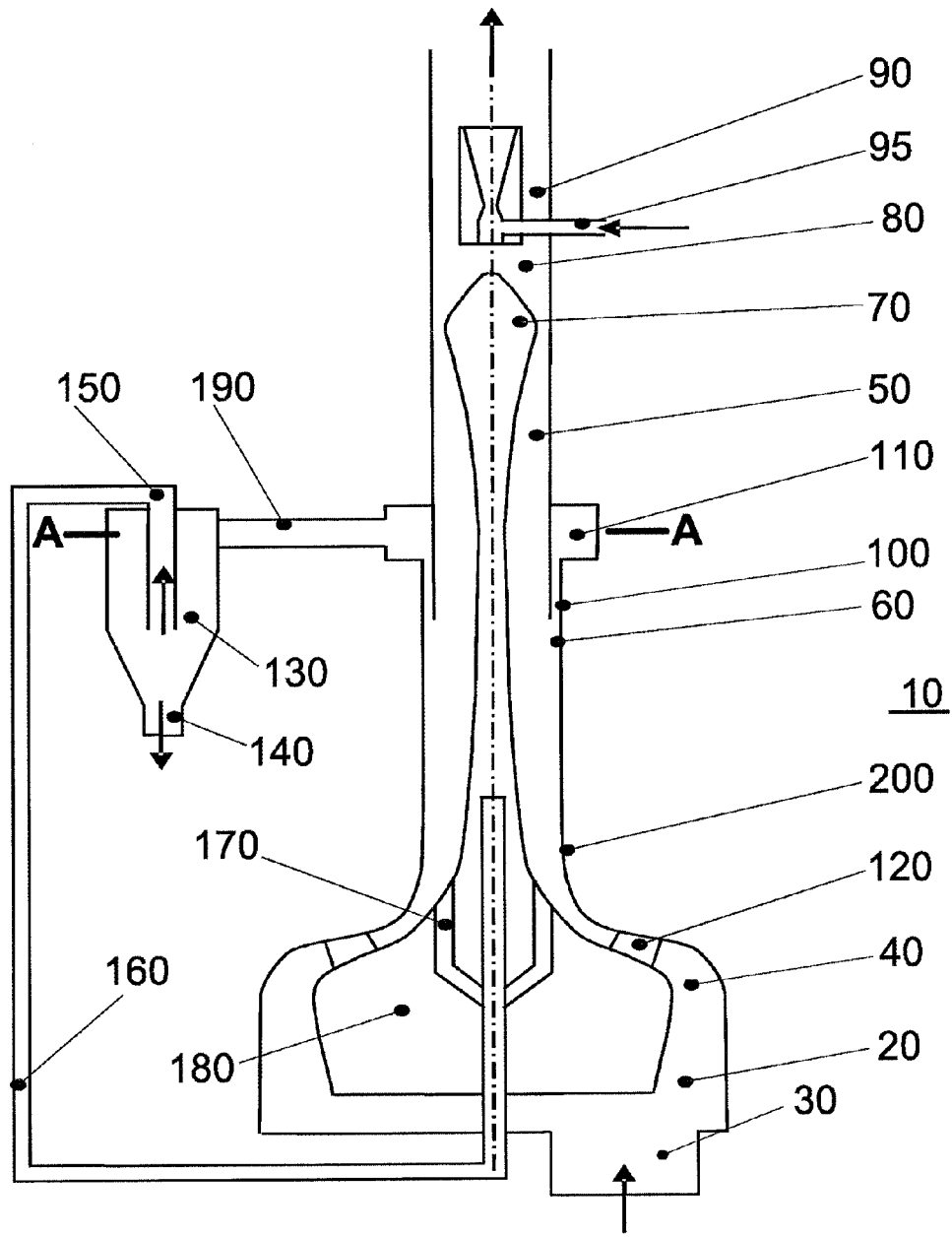
FIG. 1 is a schematic view showing an inertial extraction system in an embodiment of the invention.

The following detailed description refers to the accompanying drawings. Wherever possible, the same or similar reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention.

A gas separation apparatus 10 embodying the present invention is shown in FIGS. 1-8. Referring to FIG. 1, apparatus 10 comprises a gas chamber 20, connected to a gas inlet 30 (e.g., for incoming flue gas or other $CO_2$-containing fluid stream). A converging/diverging duct 40 creates supersonic gas flow. A swirl generator or inducer 120 creates a swirl motion of the fluid flow. Apparatus 10 includes primary gas flow outlet 50, and a condensate outlet 60 (e.g., for receiving solid $CO_2$). A capture slot 100 and capture duct 110 transport the condensate through a connection duct 190 to a cyclone particle separator 130. The flow of the gas stream in the duct 40 may be supersonic at the capture slot 100. A shroud 200, a centerbody 180, and swirl inducer 120 form a swirling flow in supersonic acceleration duct 40 and condensate outlet 60 (see also FIGS. 2 and 3). The separator 130 comprises condensate exit 140 and slip gas exit 150 connected to a recirculation line 160. In the embodiment illustrated in FIG. 1, the recirculation line 160 is connected to the centerbody 180 of the apparatus, which has injection holes 170 for slip gas injection back into supersonic acceleration duct 40. Primary gas flow outlet 50 also includes a diffuser 70 for the primary gas flow, and the diffuser 70 can have both a converging and a diverging section.

Figures 8A, 8B:
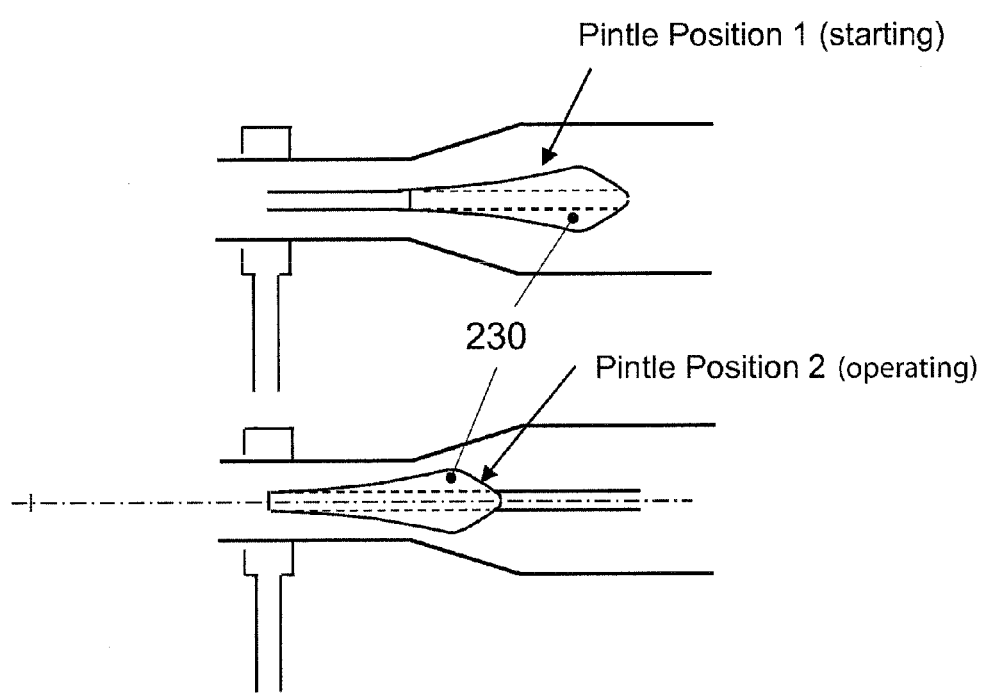
FIG. 8A is a schematic showing the system outlet with a pintle of the diffuser in a starting position.
FIG. 8B shows the pintle in a second operating position.

Diffuser 70 may include a movable pintle 230 to control primary gas flow depending upon, for example, an initial starting position or an operating position, as shown in FIGS. 8A and 8B, such that the diffuser cross-sectional area depends on the position of the movable pintle 230 in the fixed outer duct. Accordingly, the diffuser 70 can be configured to have a variable cross-sectional area during the system's operation, and a control system can be incorporated for monitoring and varying this cross-sectional area.

Figure 5:
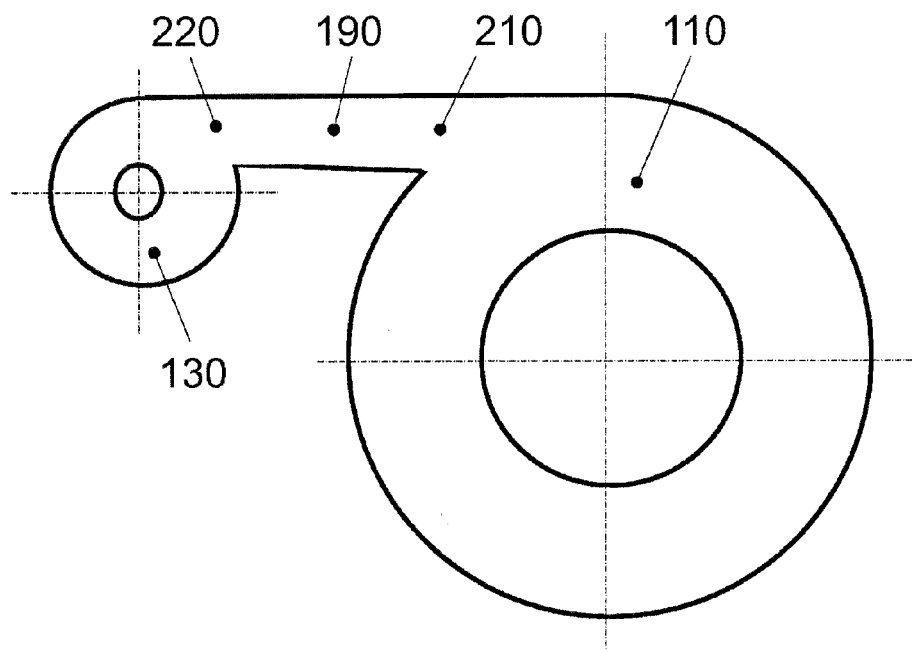
FIG. 5 is a cross-sectional schematic view along line A-A of FIG. 1, illustrating flow in the capture duct and cyclone separator.

Apparatus 10 also may include an ejector duct 90 with an inlet 80, and fed by a suitable high energy fluid, such as high pressure steam, through ejector inlet line 95. Referring to FIG. 5, preferably capture duct 110 includes a tangential exit 210 to duct 190, and a tangential inlet 220 from duct 190 to separator 130. Thus, the inlet 220 can be aligned tangentially with the capture slot 100 (FIG. 1) and/or capture duct 110.

The gas separation apparatus is intended to be a low pressure-loss device. It is based on a reversible gas expansion process. Fundamentally, only friction losses and losses associated with condensation or desublimation of a portion of the gas flow are not reversible.

The separations systems disclosed and described herein generally are applicable to any relatively low pressure gas/fluid stream that contains $CO_2$. Many industrial gas streams containing $CO_2$ exist at relatively high pressures, while the systems provided herein are particularly well suited for separations of relatively low pressure (i.e., less than about 300 psig) gas streams. Often, the pressure of the incoming low pressure gas stream to the gas separations apparatus is in a range from about 5 to about 250 psig, such as, for example, from about 5 to about 100 psig, or from about 5 to about 60 psig. Relatively low pressures (e.g., 25 psia-40 psia) generally are required at the apparatus inlet 30 in order to recover pressure of the primary flue gas flow to atmospheric pressure. However, to start the system, and depending upon the pressure of the incoming gas stream, induced low pressure (e.g., below 30% of the pressure in the inlet chamber 30) in apparatus 10 can be provided for a very short duration. The induced low pressure may be created with the assistance of the ejector duct 90 fed through the ejector feed line 95 by a high energy fluid, such as high pressure superheated steam, normally available at an industrial power plant. To increase the pressure of the incoming gas stream, it may be desirable in some circumstances for the system to further include a compressor for increasing the pressure of the low pressure gas stream prior to the entrance of the supersonic device.

After initial acceleration in the subsonic duct 20 and obtaining a high tangential velocity component at the swirl generator 120, gas flows to the supersonic acceleration duct 40 where it is accelerated to the velocity where gas static temperature is low enough for condensation or, in case of $CO_2$, desublimation of the required fraction. Precipitating particles are forced to move toward the outer wall due to the tangential velocity component generated by swirl generator 120. Particles are captured with a small amount of slip gas (typically 5%-10% of the primary gas flow) by the capture slot 100, shaped as a sharp-edged cylinder, and pass to the capture duct 110. A goal is to remove as much $CO_2$ as possible while removing as little slip gas as possible with it. To minimize losses, capture slot 100 and capture duct 110 are designed to significantly reduce axial velocity while mostly preserving the tangential momentum and to use it to the system's advantage.

The still-swirling outer flow stream is captured in a volute surrounding supersonic acceleration duct 40 and passes through connection line 190 to the cyclone separator 130, where particles are separated and go to condensate exit 140. Pressure in the capture duct 110 and cyclone separator 130 is maintained at a low enough level (e.g., can be subatmospheric) to sustain flow from the supersonic acceleration duct 40 and capture slot 100. Liquid and/or solid particles can be transported for further processing at normal pressure with an apparatus that does not require much energy (e.g., screw pump or lock hopper). Slip gas, however, often cannot be exhausted to the atmosphere without pumping, which may require significant energy. Therefore, in order to reduce energy consumption and also to increase $CO_2$ extraction rate (slip gas may still contain some $CO_2$ resublimated in the capture duct 110 and cyclone), slip gas from the cyclone separator 130 can be recycled through the slip gas recirculation line 160 and injection holes 170 in the centerbody 180 into the supersonic acceleration duct 40.

Depending on pressure recovery requirement for the slip gas, capture slot 100 can be configured as a diffuser having converging and diverging sections.

Figure 6:
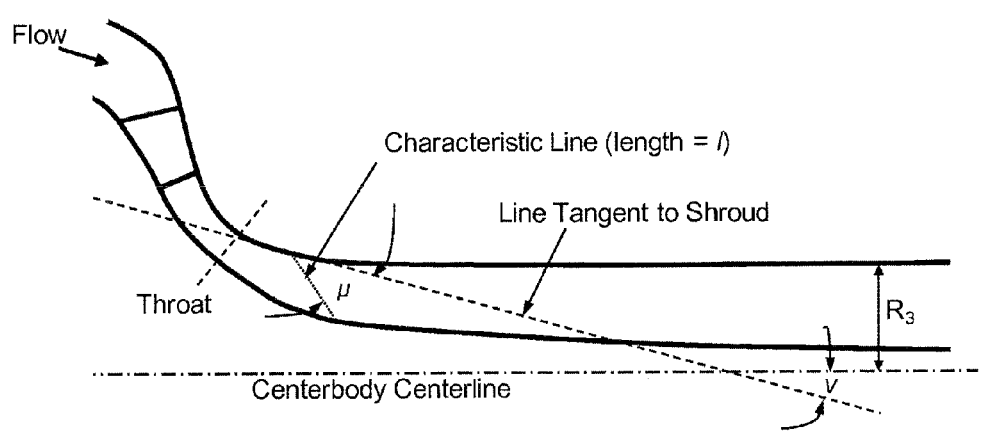
FIG. 6 is another schematic side view of the system of FIG. 1, illustrating various geometries of the diverging section of the converging/diverging duct.

FIG. 6 illustrates an embodiment of the diverging section of the converging/diverging Duct 40, as shown in FIG. 1. The outer surface (shroud) geometry is prescribed starting at the throat as a continuous smooth contour starting tangent to angle v and ending tangent to the centerbody centerline at a radial offset distance $R_3$. The line is convex with respect to a horizontal line drawn from the throat point along the positive x-axis. The inner surface (centerbody) geometry is determined mathematically to allow the flow to expand supersonically with minimal pressure losses. At each point along the shroud contour, starting at the throat and marching in small incremental steps in the axial direction, a characteristic line is drawn at the Mach angle $\mu=\arcsin(1/M)$, where M is the local Mach number. The local Mach number is defined as that which satisfies the below equation, where the angle v(x) is the angle formed between a line tangent to the shroud surface (at a particular x station) and the centerbody centerline:

$$v(x) = \sqrt{\frac{\gamma+1}{\gamma-1}} \arctan\sqrt{\frac{\gamma-1}{\gamma+1}(M^2-1)} - \arctan\sqrt{M^2-1}.$$

A point on the centerbody is defined at the end of the characteristic line at length [l]. The length [l] is defined as that which results in an annular flow area [A] at a cross section along the characteristic line that satisfies the below formula:

$$\frac{A^*}{A} = \left(\frac{\gamma+1}{2}\right)^{\frac{\gamma+1}{2(\gamma-1)}} M\left(1+\frac{\gamma-1}{2}M^2\right)^{-\frac{\gamma+1}{2(\gamma-1)}}.$$

Here, A* is the area of the throat as defined by the scale of unit and specification of the centerbody radius at the point of full expansion. Repeating this process along the entire shroud contour will define the centerbody contour.

Furthermore, the centerbody contour definition process can be modified using corrections for thermodynamic and transport properties including, but not limited to, isentropic exponent, Mach number, pressure, and temperature to account for the effects of finite rate condensation.

In embodiments directed to the separation of more than one condensable fluid, where the combination of these fluids in a single flow stream is not desirable, several capture slots can be employed in a supersonic inertial separation system. For example, if the incoming gas stream, such as flue gas, contains water vapor and it is not desirable to combine water and $CO_2$ in one flow due to corrosion limitations, water will be condensed earlier in the supersonic duct, then $CO_2$ will desublimate. Therefore, to prevent water and $CO_2$ capture in a single duct, an additional capture slot for water droplets can be installed in the supersonic acceleration duct 40 upstream of the $CO_2$ capture slot. The water capture slot can also be combined with a boundary layer removal slot.

Consistent with some embodiments of the present invention, a supersonic $CO_2$ separation system can comprise (a) a supersonic device comprising an entrance for a low pressure gas stream comprising $CO_2$, a shroud, a centerbody, a converging/diverging annular duct between the shroud and the centerbody, a capture slot for receiving solid $CO_2$, and an exit for a supersonic $CO_2$-depleted gas stream; (b) a diffuser for reducing the velocity of the supersonic $CO_2$-depleted gas stream to a subsonic speed, the diffuser having a subsonic gas stream exit; (c) an ejector apparatus comprising an ejector inlet connected to the subsonic gas stream exit, a high pressure fluid inlet duct for inducing a low pressure, and an ejector apparatus exit; (d) a swirl generator positioned in the converging/diverging duct; (e) a cyclone particle separator comprising a separator inlet connected to the capture slot, a separator exit for processing solid $CO_2$, and a slip gas exit; and (f) a slip gas recirculation line from the slip gas exit, through the centerbody of the supersonic device, and exiting at a diverging portion of the converging/diverging duct. In these and other embodiments, the swirl generator can have a swirl generator entrance and a swirl generator exit, and a converging/diverging duct radius at the swirl generator entrance that is greater than at the swirl generator exit.

While the supersonic $CO_2$ separation system described above contains elements (a) through (f), other embodiments provided herein are directed to systems that do not require all of these elements. For instance, a separation system can employ elements (a), (b), and (d), and optionally can further contain element (c), and/or element (e), and/or element (f), and these optional elements can be used in any combination. Accordingly, a supersonic $CO_2$ separation system can comprise a supersonic device comprising an entrance for a low pressure gas stream comprising $CO_2$, a shroud, a centerbody, a converging/diverging annular duct between the shroud and the centerbody, a capture slot for receiving solid $CO_2$, and an exit for a supersonic $CO_2$-depleted gas stream; a diffuser for reducing the velocity of the supersonic $CO_2$-depleted gas stream to a subsonic speed, the diffuser having a subsonic gas stream exit; and a swirl generator positioned in the converging/diverging duct, the swirl generator having a swirl generator entrance and a swirl generator exit, and a converging/diverging duct radius at the swirl generator entrance is greater than at the swirl generator exit. Optionally, in an embodiment, this system can further include an ejector apparatus. The ejector apparatus can contain an ejector inlet connected to the subsonic gas stream exit, a high pressure fluid inlet duct for inducing a low pressure, and an ejector apparatus exit.

In another embodiment, the system can further include a particle separator, such as a particle separator containing a separator inlet connected to the capture slot, a separator exit for processing solid $CO_2$, and a slip gas exit. Often, the particle separator is a cyclone particle separator, although this is not a requirement.

In another embodiment, the system can further include a slip gas recirculation line from the slip gas exit. The slip gas recirculation line typically exits in the supersonic device at a location upstream of the capture slot. For instance, the slip gas recirculation line can pass through the centerbody of the supersonic device, and exit at a diverging portion of the converging/diverging duct.

As disclosed hereinabove, the separation systems of this invention generally are applicable to any relatively low pressure $CO_2$-containing inlet gas stream, i.e., at a pressure of less than about 300 psig. Moreover, the systems of this invention are not particularly limited to the amount of $CO_2$ in the incoming gas stream. Typically, the percentage of $CO_2$ in the inlet gas stream can range from as little as about 2 wt. % to as much as about 85 wt. %. In some embodiments, $CO_2$ is a minority component in the gas stream, with percentages in the 2 wt. % to 45 wt. % range, 3 wt. % to 30 wt. % range, or 6 wt. % to 25 wt. % range. In a particular embodiment contemplated herein, the low pressure gas stream can comprise flue gas. Generally, the source of flue gas is an exhaust gas from a combustion power plant.

The efficiency of the supersonic device and $CO_2$ separation system can be characterized by comparing the amount of solid $CO_2$ received in the capture slot to the amount of $CO_2$ in the incoming gas stream. In some embodiments, the percentage of the amount of solid $CO_2$ received in the capture slot, based on the amount of $CO_2$ in the incoming gas stream, is greater than about 50%, while in other embodiments, the percentage of the amount of solid $CO_2$ received in the capture slot, based on the amount of $CO_2$ in the incoming gas stream, is greater than about 60%; alternatively, greater than about 75%; or alternatively, greater than about 90%.

Figure 2:
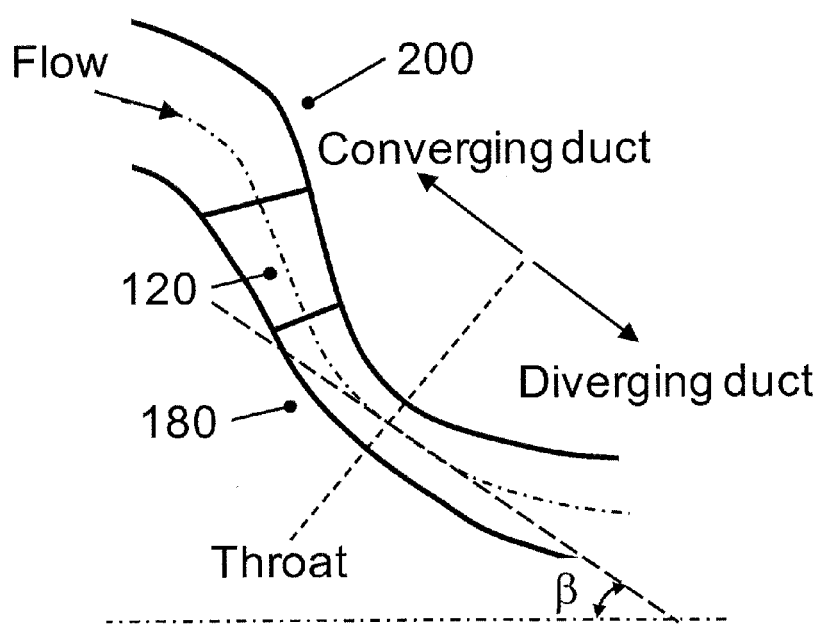
FIG. 2 is a schematic side view along a central axis of the system of FIG. 1, illustrating the location of a swirl generator in a converging/diverging duct.
Figure 3:
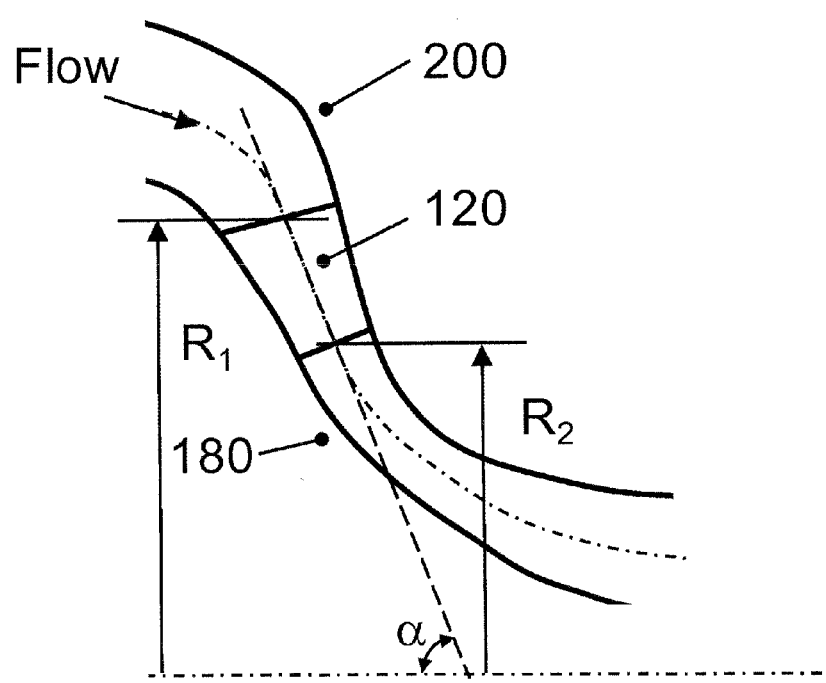
FIG. 3 is another schematic side view of the system of FIG. 1, illustrating various geometries of the swirl generator in the converging/diverging duct.

There are many variations in the design and positioning of the swirl generator that are suitable for use in the supersonic device. As an example, the swirl generator can contain a plurality of vanes or blades. Although not a requirement, the swirl generator can be positioned in a converging portion of the converging/diverging duct, as shown in FIGS. 2 and 3. Furthermore, as illustrated in FIG. 3, the swirl generator 120 can have a swirl generator centerline, and the centerbody 180 can have a centerbody centerline. The average angle ($\alpha$) between the swirl generator centerline and the centerbody centerline is in a range from about 5 to 90 degrees, and more often, can be in a range from about 45 to 70 degrees, or from 50 to 65 degrees.

Figures 4A, 4B:
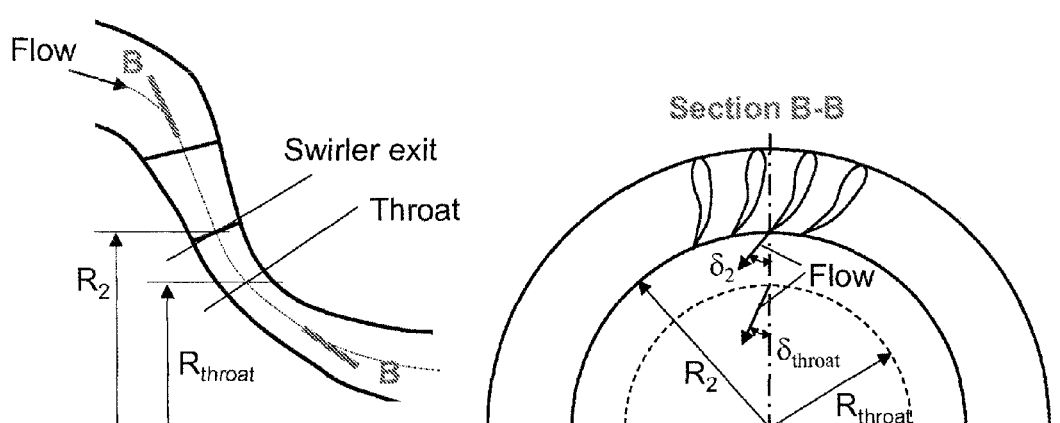
FIG. 4A is another schematic side view of the system of FIG. 1, illustrating various geometries of the swirl generator centerline and throat centerline.
FIG. 4B is a cross-sectional schematic view along meridian line B-B of FIG. 4A, illustrating various geometries correlating swirl angles and centerline radiuses.

Referring now to FIGS. 4A and 4B, the angle at the exit of the swirl generator, $\delta_2$, can be characterized by the following equations in some embodiments:

$$\overline{A} = M_2 \left( \frac{1 + \frac{\gamma-1}{2}}{1 + \frac{\gamma-1}{2}M_2^2} \right)^{\frac{\gamma+1}{2(\gamma-1)}} \quad (1)$$

$$\delta_2 = \arctan[(R_{throat}/R_2) \cdot M_2 \tan \delta_{throat}]. \quad (2)$$

In these equations, $\overline{A}$ is the ratio of cross-sectional area at an exit of the swirl generator and at the throat of the converging/diverging duct, $\delta_2$ is the flow swirl angle at the exit of the swirl generator, $\delta_{throat}$ is the flow swirl angle at the throat of the converging/diverging duct, $M_2$ is the Mach number at the exit from the swirl generator, $R_2$ is the radius of the centerline of exit of the swirl generator, $R_{throat}$ is the radius of the centerline of the throat of the converging/diverging duct, and $\gamma$ is the ratio of the gas stream specific heats. The swirl angle is defined as the following velocity ratio:

$$\delta = \arctan\left(\frac{V_{tangential}}{V_{axial}}\right).$$

In some embodiments, it can be beneficial for the ratio, $R_{throat}/R_2$, to be in the range of 0.90 to 1.0 (or in the range of 0.98 to 0.995) and, additionally or alternatively, for $\overline{A}$ to be in the range of 1.0 to 2.9 (or in the range of 1.05 to 1.3). Generally, the flow swirl angle downstream of the throat is in a range from about 5 to about 45 degrees, or from about 10 to 40 degrees.

In addition to these variations with the swirl generator, the shape and design of the converging/diverging duct can impact the performance of the supersonic device. In FIG. 2, the aerodynamic throat of the duct is illustrated as the location of minimum cross-sectional area. The aerodynamic throat of the converging/diverging duct can have a throat centerline, and the centerbody has a centerbody centerline. Beneficially, the angle ($\beta$) between the throat centerline and the centerbody centerline is in a range from about 5 to 90 degrees, and more often, can be in a range from about 5 to 60 degrees, or from about 10 to 50 degrees.

In addition to the cyclone particle separator 130 illustrated in FIG. 1, the system can further include a vessel for storing $CO_2$. This vessel can be configured to have an exit for removing supercritical or gaseous $CO_2$ from the vessel. Additionally or alternatively, a heat exchanger can be utilized for vaporizing $CO_2$ in the vessel with a heat transfer fluid to produce self-pressurized supercritical $CO_2$. Suitable heat transfer fluids include, but are not limited to, a portion of the low pressure gas stream upstream of the supersonic device, a portion of the subsonic gas stream exiting the diffuser, a source of waste heat from a power plant, and the like, as well as combinations thereof.

Figure 7:
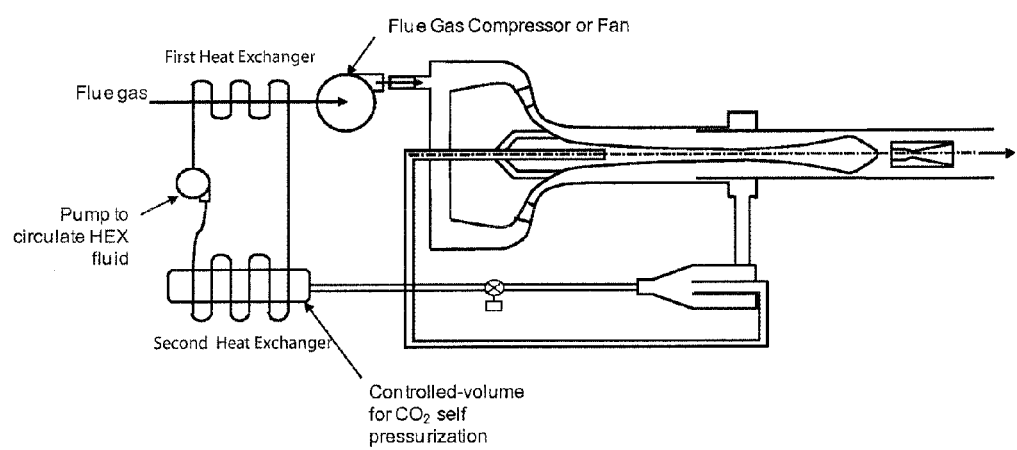
FIG. 7 is a further view of the system of FIG. 1, illustrating connection to a flue gas inlet and heat exchange system.

In another embodiment, the heat exchange system illustrated schematically in FIG. 7 can be employed. Hence, the system can include a first heat exchanger for cooling a first heat transfer fluid with a second heat transfer fluid, and a second heat exchanger for vaporizing $CO_2$ in the vessel with the second heat transfer fluid to produce self-pressurized supercritical $CO_2$. As above, suitable first heat transfer fluids include, but are not limited to, a portion of the low pressure gas stream upstream of the supersonic device, a portion of the subsonic gas stream exiting the diffuser, a source of waste heat from a power plant, and the like, as well as combinations thereof.

Embodiments of this invention also are directed to methods of removing $CO_2$ from a low pressure gas stream. One such method comprises (i) introducing the low pressure gas stream into a supersonic device and accelerating the gas stream to supersonic speeds, (ii) swirling the low pressure gas stream while at supersonic speeds, (iii) separating the low pressure gas stream under supersonic speeds into a main gas stream and a product stream, the product stream comprising solid $CO_2$, (iv) removing solid $CO_2$ from the product stream, and (v) recirculating a portion of the product stream into the supersonic device. While not limited thereto, the supersonic device can be any of the supersonic devices disclosed hereinabove and illustrated in the accompanying figures.

As above, the pressure of the low pressure gas stream in step (i) can be less than about 300 psig, for example, from about 5 to about 250 psig, from about 5 to about 100 psig, or from about 5 to about 60 psig. In circumstances where the incoming gas stream pressure is, for example, below about 40 psia, a step of reducing the pressure of the subsonic main gas stream for a brief period of time to initiate main supersonic flow may be employed. Often, this step can be accomplished by flowing a high pressure fluid stream (e.g., using air, water, and/or steam) into the subsonic main gas stream. Additionally or alternatively, prior to step (i), the pressure of the incoming low pressure gas stream can be increased using any suitable means, such as a compressor device.

Such methods of removing $CO_2$ from a gas stream are applicable to a wide range of $CO_2$ contents. Generally, the percentage of $CO_2$ in the incoming gas stream can range from as little as about 2 wt. % to as much as about 85 wt. %. Other suitable ranges include, but are not limited to, from about 2 wt. % to 45 wt. %, from about 3 wt. % to about 30 wt. %, or from about 6 wt. % to about 25 wt. % range. The methods disclosed herein are particularly well suited for embodiments where the incoming low pressure gas stream comprises flue gas.

In step (ii), the low pressure gas stream is swirled at supersonic speeds. The initiation of swirling, however, can be performed at subsonic speeds or at supersonic speeds.

The $CO_2$ removal efficiency of the disclosed methods can be characterized by comparing the amount of solid $CO_2$ in the product stream versus the amount of $CO_2$ in the incoming gas stream. In some embodiments, the percentage of the amount of solid $CO_2$ in the product stream, based on the amount of $CO_2$ in the incoming gas stream, is greater than about 50%; alternatively, greater than about 60%; alternatively, greater than about 75%; or alternatively, greater than about 90%. After the product stream containing $CO_2$ has been formed, the flow rate of the main gas stream can be reduced to a subsonic speed.

Solid $CO_2$ is removed from the product stream in step (iv). In some embodiments, a cyclone particle separator can be used to separate the solid $CO_2$ from the product stream, and often operated at a sub-atmospheric pressure. A further step of storing the solid $CO_2$ in a vessel, after recovery from the cyclone separator, can be performed if desired. In such circumstances, $CO_2$ can be vaporized in the vessel by exchanging heat with a heat transfer fluid, either directly or indirectly, to produce self-pressurized supercritical $CO_2$. Single stage or two stage heat transfer loops can be used, as well as any suitable heat transfer fluid, for example, a portion of the low pressure incoming gas stream can be used.

In step (v), a portion of the product stream can be recirculated back into the supersonic device. This recirculated portion can enter the supersonic device before, during, and/or after step (iii). Typically, the portion of the product stream that is recirculated re-enters the supersonic device prior to step (iii) and the separation of the low pressure gas stream into the main gas stream and the product stream comprising solid $CO_2$. While not being limited thereto, the percentage of the recirculated portion of the product stream, based on the incoming low pressure gas stream, generally is less than about 10 wt. %, for example, less than about 5 wt. %.

EXAMPLES

An experimental test unit for demonstrating $CO_2$ particle separation from a gas stream was built generally in accordance with the design illustrated in FIG. 1. For these initial experiments, the capture duct/slot, cyclone separator, and slip gas recirculation were not included, and a vacuum system was employed for start-up to represent the ejector system.

As a control, an air-only flow was used, while the experimental gas stream contained 20 wt. % $CO_2$ (and 80 wt. % air). The pressure at the inlet to the supersonic device was 35 psia, and the flow rate was 1.75 lb/sec, a roughly equivalent flue gas slip stream to that emanating from a 0.5 MW coal power plant. Particle scattering using a Nd-Yag laser was used in these tests, and photographs were taken to determine $CO_2$ particle migration to the outer wall, constructed of quartz glass.

Figure 9A:
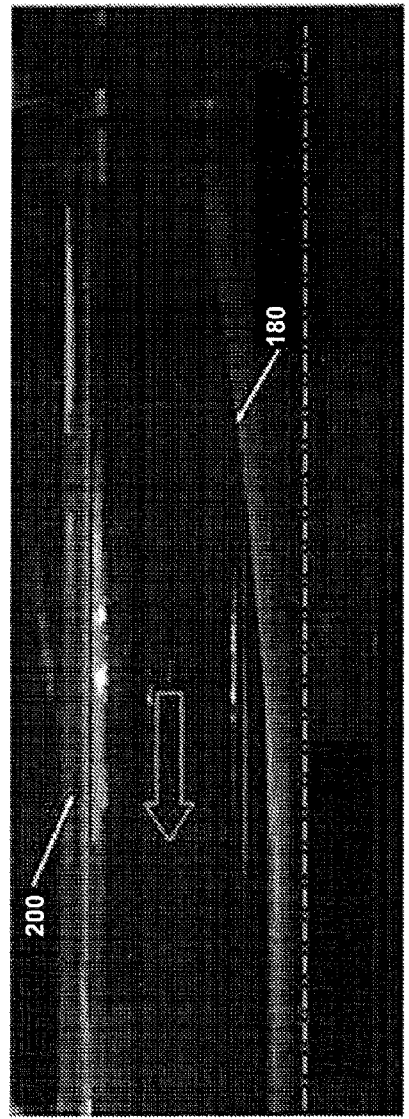
FIG. 9A is a photograph of a section of the experimental $CO_2$ separation device with a flow of an air stream.
Figure 9B:
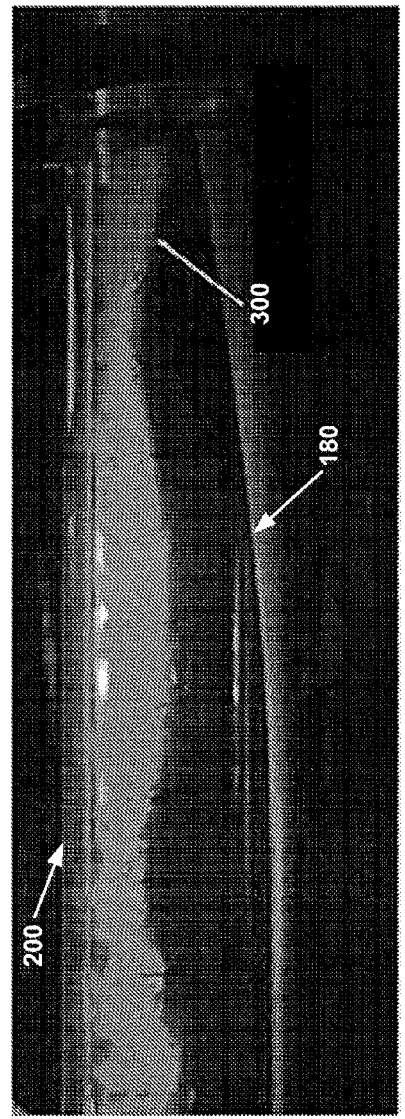
FIG. 9B is a photograph of a section of the experimental $CO_2$ separation device with a flow of a $CO_2$-containing gas stream.

FIG. 9A is a photograph of a section of the experimental $CO_2$ separation device with the flow of the air stream, while FIG. 10A is a schematic representation of the photograph of FIG. 9A. In these figures, the direction of flow is from right to left. FIG. 9B is a photograph of a section of the experimental $CO_2$ separation device with the flow of 20 wt. % $CO_2$ gas stream, while FIG. 10B is a schematic representation of the photograph of FIG. 9B. As illustrated in these figures, evidence of $CO_2$ separation and particle migration to the outer wall was observed. The white cloud 300 in FIG. 9B is the solid $CO_2$ separating from the main gas stream and migrating to the outer wall of the supersonic device. FIG. 10B illustrates the solid $CO_2$ as particles 300 at the top portion of the supersonic device, while the main gas stream is devoid of such $CO_2$ particles.

While certain embodiments of the invention have been described, other embodiments may exist. Further, any disclosed methods' stages may be modified in any manner, including by reordering stages and/or inserting or deleting stages, without departing from the invention. While the specification includes examples and representative drawings, the invention's scope is indicated by the following claims. Furthermore, while the specification has been described in language specific to structural features and/or methodological acts, the claims are not limited to the features or acts described above. Rather, the specific features and acts described above are disclosed as illustrative embodiments of the invention.

We claim:

1. A supersonic $CO_2$ separation system comprising:
    a supersonic device comprising:
        an entrance for a low pressure gas stream comprising $CO_2$;
        a shroud;
        a centerbody;
        a converging/diverging annular duct between the shroud and the centerbody;
        a capture slot configured and positioned to remove particles of solid $CO_2$ to form a solid $CO_2$ stream; and
        an exit for a supersonic $CO_2$-depleted gas stream;
    a diffuser configured and positioned to reduce a velocity of the supersonic $CO_2$-depleted gas stream to a subsonic speed, and exhibiting a subsonic gas stream exit;
    an ejector apparatus comprising:
        an ejector inlet connected to the subsonic gas stream exit;
        a high pressure fluid inlet duct for inducing a low pressure; and
        an ejector apparatus exit;
    a swirl generator within the converging/diverging annular duct;
    a capture duct comprising an inlet connected to the capture slot, a connection duct tangential to the inlet, and an outlet tangential to the connection duct;
    a cyclone particle separator comprising:
        a separator inlet connected to the outlet of the capture duct;
        a separator exit for a product stream comprising solid $CO_2$; and
        a slip gas exit; and
    a slip gas recirculation line extending from the slip gas exit and partially through the centerbody of the supersonic device along a centerline of the centerbody, sidewalls of the slip gas recirculation line connected to injection holes within the centerbody exiting into a diverging portion of the converging/diverging annular duct.

2. The system of claim 1, wherein the swirl generator has a swirl generator entrance and a swirl generator exit, and a converging/diverging annular duct radius at the swirl generator entrance is greater than at the swirl generator exit.

3. The system of claim 1, further comprising:
    the low pressure gas stream at the entrance of the supersonic device, the low pressure gas stream having a pressure within a range from about 5 to about 250 psig and comprising flue gas and from about 2% to about 85% $CO_2$ by weight; and the product stream at the separator exit of the cyclone particle separator, an amount of the solid $CO_2$ in the product stream greater than about 50% by weight based on an amount of $CO_2$ in the low pressure gas stream.

4. The system of claim 1, wherein the diffuser comprises:
a converging and diverging section; and
a movable pintle in a fixed outer duct, a diffuser cross-sectional area depending on the position of the movable pintle in the fixed outer duct.

5. The system of claim 1, further comprising:
a vessel for storing $CO_2$ downstream of the separator exit of the cyclone particle separator; and
a heat exchanger system comprising:
    a first heat exchanger configured and positioned to cool at least one of a portion of the low pressure stream upstream of the supersonic device or a portion of a subsonic gas stream exiting the diffuser with a heat transfer fluid;
    a second heat exchanger configured and positioned to vaporize $CO_2$ in the vessel with the heat transfer fluid to produce self-pressurized supercritical $CO_2$; and
    a pump configured and positioned to circulate the heat transfer fluid between the first heat exchanger and the second heat exchanger.

6. The system of claim 1, wherein the injection holes within the centerbody exhibit a bent configuration between the slip gas recirculation line and the diverging portion of the converging/diverging annular duct.

7. The system of claim 1, wherein the exit of the supersonic device exhibits a cylindrical shape, and wherein the capture slot comprises an area between the exit and a cylindrical structure circumscribing the exit.

8. The system of claim 1, wherein an inlet of the swirl generator exhibits a larger diameter than an outlet of the swirl generator.

9. The system of claim 1, further comprising a water capture slot in the converging/diverging annular duct.

10. A supersonic $CO_2$ separation system comprising:
a supersonic device comprising:
    an entrance for a low pressure gas stream comprising $CO_2$;
    a shroud;
    a centerbody;
    a converging/diverging annular duct between the shroud and the centerbody;
    a capture slot for receiving solid $CO_2$; and
    an exit for a supersonic $CO_2$-depleted gas stream;
a capture duct configured to substantially reduce the axial velocity of a material stream directed thereto while maintaining the tangential momentum of the material stream, the capture duct comprising an inlet connected to the capture slot, a duct connected to the inlet, and an outlet connected to the duct and tangentially aligned with at least one of the capture slot or the duct;
a diffuser configured to reduce the velocity of the supersonic $CO_2$-depleted gas stream to a subsonic speed, the diffuser having a subsonic gas stream exit and comprising:
    a converging and diverging section; and
    a movable pintle in a fixed outer duct, a diffuser cross-sectional area depending on the position of the movable pintle in the fixed outer duct;
a swirl generator positioned in the converging/diverging annular duct and having a swirl generator entrance and a swirl generator exit, a converging/diverging annular duct radius at the swirl generator entrance greater than at the swirl generator exit; and
a slip gas recirculation line connected to a particle separator downstream of the capture duct and extending from the particle separator and partially through the centerbody of the supersonic device along a centerline of the centerbody, sidewalls of the slip gas recirculation line connected to injection holes within the centerbody exiting into a diverging portion of the converging/diverging annular duct.

11. The system of claim 10, wherein the swirl generator has a swirl generator centerline, and an average angle between the swirl generator centerline and the centerline of the centerbody is in a range from about 5 to 90 degrees.

12. The system of claim 10, wherein an aerodynamic throat of the converging/diverging duct has a throat centerline, and an angle between the throat centerline and the centerline of the centerbody is in a range from about 5 to 90 degrees.

13. The system of claim 10, wherein an angle at the exit of the swirl generator $\delta_2$ is characterized by the following equations:

$$\overline{A} = M_2 \left( \frac{1 + \frac{\gamma-1}{2}}{1 + \frac{\gamma-1}{2}M_2^2} \right)^{\frac{\gamma+1}{2(\gamma-1)}} \quad (1)$$

$$\delta_2 = \arctan[(R_{throat}/R_2) \cdot M_2 \tan \delta_{throat}] \quad (2)$$

wherein:
$\overline{A}$ is a ratio of cross-sectional area at an exit of the swirl generator and at a throat of the converging/diverging duct;
$\delta_2$ is a flow swirl angle at the exit of the swirl generator;
$\delta_{throat}$ is a flow swirl angle at the throat of the converging/diverging annular duct;
$M_2$ is a Mach number at an exit from the swirl generator;
$R_2$ is a radius of the centerline of exit of the swirl generator;
$R_{throat}$ is a radius of the centerline of the throat of the converging/diverging annular duct; and
$\gamma$ is a ratio of the gas stream specific heats;
wherein the definition of the swirl angle is $$\delta = \arctan\left(\frac{V_{tangential}}{V_{axial}}\right).$$

14. The system of claim 13, wherein:
$R_{throat}/R_2$ is in the range of from 0.90 to 1.0; and
$\overline{A}$ is in the range of from 1.0 to 2.9.

15. The system of claim 13, wherein the flow swirl angle downstream of the throat is in a range from about 5 to about 45 degrees.

16. The system of claim 10, further comprising:
an ejector apparatus comprising:
    an ejector inlet connected to the subsonic gas stream exit;
    a high pressure fluid inlet duct for inducing a low pressure; and
    an ejector apparatus exit.

17. The system of claim 10, wherein the particle separator comprises a cyclone particle separator.

18. A method for removing $CO_2$ from a low pressure gas stream, the method comprising:
introducing the low pressure gas stream into a supersonic device and accelerating the gas stream to supersonic speeds, the supersonic device comprising an entrance for the low pressure gas, a shroud, a centerbody, a converging/diverging annular duct between the shroud and the centerbody, a capture slot, and an exit;

swirling the low pressure gas stream while at supersonic speeds using a swirl generator within the converging/diverging annular duct to form a swirling flow stream;

removing particles of solid $CO_2$ from the swirling flow stream using the capture slot of the supersonic device to form a solid $CO_2$ stream and a supersonic $CO_2$-depleted gas stream;

reducing the velocity of the supersonic $CO_2$-depleted gas stream to a subsonic speed using a diffuser to form a subsonic gas stream;

directing the subsonic gas stream through an ejector apparatus comprising an ejector inlet connected to an exit of the diffuser, a high pressure fluid inlet duct for inducing a low pressure, and an ejector apparatus exit;

directing the solid $CO_2$ stream through a capture duct comprising an inlet connected to the capture slot, a connection duct tangential to the inlet, and an outlet tangential to the connection duct;

delivering the solid $CO_2$ stream from the capture duct into a cyclone particle separator to form product stream comprising solid $CO_2$ and a slip gas, the cyclone particle separator comprising a separator inlet connected to the outlet of the capture duct, a separator exit for the product stream, and a slip gas exit; and recirculating the slip gas into the supersonic device using a slip gas recirculation line extending from the slip gas exit and partially through the centerbody of the supersonic device along a centerline of the centerbody, sidewalls of the slip gas recirculation line connected to injection holes within the centerbody exiting into a diverging portion of the converging/diverging duct.

19. The method of claim 18, wherein recirculating the slip gas into the supersonic device comprises recirculating the slip gas into the supersonic device prior to removing particles of solid $CO_2$ from the swirling flow stream using the capture slot of the supersonic device to form the solid $CO_2$ stream and the supersonic $CO_2$-depleted gas stream.

20. The method of claim 18, further comprising increasing the pressure of the low pressure gas stream prior to introducing the low pressure gas stream into the supersonic device and accelerating the gas stream to supersonic speeds.

21. The method of claim 18, wherein:
the low pressure gas stream has a pressure less than about 300 psig and comprises from about 2% to about 85% $CO_2$ by weight; and
the amount of solid $CO_2$ in the product stream is greater than about 50% by weight based on an amount of $CO_2$ in the low pressure gas stream.

22. The method of claim 18, wherein the low pressure gas stream has a pressure within a range from about 5 to about 250 psig and comprises flue gas and from about 3% to about 30% $CO_2$ by weight.

* * * * *